United States Patent [19]

LaRussa

[11] 4,439,755
[45] Mar. 27, 1984

[54] HEAD-UP INFINITY DISPLAY AND PILOT'S SIGHT

[75] Inventor: Joseph A. LaRussa, Yorktown Heights, N.Y.

[73] Assignee: Farrand Optical Co., Inc., Valhalla, N.Y.

[21] Appl. No.: 270,416

[22] Filed: Jun. 4, 1981

[51] Int. Cl.³ .................... G09G 3/00; G01C 21/00
[52] U.S. Cl. .................................. 340/980; 340/705; 358/104; 358/250; 434/44
[58] Field of Search .............. 340/27 NA, 27 R, 705; 73/178 R, 178 H; 358/104, 250; 434/44

[56] References Cited

U.S. PATENT DOCUMENTS

| 3,230,819 | 1/1966 | Noxon | 358/250 |
| 4,028,725 | 6/1977 | Lewis | 358/103 |
| 4,048,653 | 9/1977 | Spooner | 340/27 NA |
| 4,347,508 | 8/1982 | Spooner | 340/27 R |

FOREIGN PATENT DOCUMENTS

| 1439944 | 6/1976 | United Kingdom | 340/27 NA |
| 1527049 | 10/1978 | United Kingdom | 340/27 NA |

OTHER PUBLICATIONS

"Helmet Mounted Sights and Display Systems," Shepherd, AGARD Lecture Series No. 76 on Electro-Optical Systems, London, UK, May 1975.
"They're Redesigning the Airplane," Long, National Geographic, Jan. 1981, vol. 159, No. 1.
"The SPASYN" Kuipers, Dec. 1976.
"SPASYN II-OFFSET GUIDANCE SYSTEM"-circular from Advanced Technology Systems.

Primary Examiner—James J. Groody
Attorney, Agent, or Firm—Anthony H. Handal

[57] ABSTRACT

A system for presenting a head-up display to the operator of a vehicle is disclosed. This system comprises a light source fiber optic bundle (52) which is secured to the helmet of the vehicle operator and generates a light beam signal which travels at an angle proportional to the orientation of the pilot's head and, accordingly, his line-of-sight. This beam is detected by a detector (68) which is optically coupled to the light beam and provides line-of-sight information at its ouput. A computer (96) receives the line-of-sight information together with other information and sends it via a cathode ray tube (112) and an optical coupler (14) to a beamsplitter (16) which provides that information to the operator of the vehicle while allowing the operator to see through the beamsplitter (16), thus providing the operator with additional information without obstructing his view.

23 Claims, 12 Drawing Figures

HEAD-UP INFINITY DISPLAY AND PILOT'S SIGHT

TECHNICAL FIELD

The invention relates to a head-up display and pilot's sight system for a vehicle which allows the pilot to view a display of information generated by the vehicle's instruments as well as information with respect to the orientation of the vehicle, the pilot's line-of-sight, the orientation of the vehicle's guns, and through computer processing a projected reticle of weapon impact points, enhanced or computer-processed data base images of the terrain over which the vehicle is passing and/or the like, without preventing the pilot from continuing to look out the windscreen of the vehicle. When used as an aiming sight the device utilizes a computed impact point reticle together with a line-of-sight reticle which, with a corrective loop and the superposition of both reticles, assures the accuracy of the system.

BACKGROUND ART

The piloting of a vehicle, such as an aircraft (or other advanced vehicles, i.e. a tank), is recognized as an extremely complex task because of the fact that the vehicle is free to move while exercising six degrees of freedom, in the case of an aircraft, including three degrees of translational freedom and three degrees of rotational freedom. In flying an aircraft, a pilot must reconstruct all six of these variables into a single trajectory and relate them to the three-dimensional world seen outside the windscreen. Some idea of the complexity of this task may be achieved by comparing it to the driving of an automobile, which is free to move with only two orthogonal degrees of freedom, thus resulting in only one angular degree of freedom which is, in any case, tied to the orthogonal movement, as long as no skidding is experienced. Display of vehicle instrument data in a head-up mode (head-up display or HUD) against the view through the windscreen may be achieved by placing a dichroic reflector in front of the windscreen and mounting a cathode ray tube with appropriate optical elements in the instrument panel of the vehicle to generate an image which may be reflected by the dichroic beamsplitter to be viewed by the pilot. It is noted that dichroic reflectors reflect only a selected wavelength while inhibiting that wavelength from being transmitted. After subtracting that wavelength from the outside world illumination, the contrast of the projected information is thus enhanced. For such purposes only employs the normal type of beamsplitter, known as a neutral density beamsplitter. Likewise, because of the properties of the dichroic reflector, the pilot may simultaneously see through the dichroic reflector and thus have a relatively unobstructed view through the windscreen. This system allows the addition of other functions, for example enhanced images can also be fed to the cathode ray tube, thus allowing the pilot to "see" during poor visibility conditions. Likewise, data with respect to the orientation of guns and the flight path of an aircraft could also be displayed by the system. Moreover, by appropriate selection of optical elements between the cathode ray tube and the dichroic reflector, the images projected on the dichroic reflector can be made to appear to be projected to optical infinity. Thus, the pilot can observe the instrumentation and other information while still focusing on the scene outside his windscreen.

In spite of the many obvious advantages of this system, it also has a number of problems which preclude its widespread employment in, for example, the aviation industry. Firstly, few existing aircraft have sufficient space available on an already crowded instrument panel to allow for the retro-fitting of this device. Secondly, even in the case of employment in newly designed aircraft, the demands for instrument panel space are such that the space is difficult or sometimes impossible to provide. Finally, there is also some objection to placing a dichroic reflector in front of the windscreen of an aircraft.

In an attempt to provide a head-up display system which does not have the disadvantages of the instrument panel dichroic reflector system described above, a system in which a television cathode ray tube is mounted on an aircraft pilot's helmet for viewing by the pilot has been developed. A display of the pilot's line-of-sight is also synthesized in this system, in order that slewable aircraft guns may be directed to fire along the pilot's line-of-sight onto a desired target. The pilot's helmet is necessarily provided with a device in which changes in a magnetic field created in the cockpit by a special apparatus are detected. The nature of the disturbance of the magnetic field tells an on-board computer the orientation of the pilot's helmet and, thus, his line-of-sight. This allows the slaving of guns or other systems on board the aircraft to movements of the pilot's head.

While this magnetic system solves the problems discussed above in connection with the instrument panel system, it does suffer from a number of its own significant problems. First, the pilot is forced to carry a great deal of heavy equipment on his head. This has prevented widespread adoption of the system inasmuch as most pilots find this unacceptable. In addition, in view of the fact that the helmet must be hard wired to a video generator inside the aircraft, this apparatus interferes with pilot ejection, should an emergency situation arise. Finally, the apparatus is very expensive, and because of its sophistication the cost of programming and aligning it is commensurate with the hardware cost. This is especially significant in view of the fact that alignment should be periodically checked and adjusted.

DISCLOSURE OF INVENTION

The invention, as claimed, is intended to provide a remedy. While, for the sake of clarity, it is described in terms of an aircraft, it is contemplated that the inventive apparatus will find application in other vehicles (such as tanks), vehicle simulators and other non-vehicular applications. As used herein, the term pilot refers to the operator of a vehicle simulator or other device whether an aircraft, tank, ship or the like. It solves the problem of providing a head-up display for a vehicle which does not take up any space on the instrument panel, may be retro-fitted to existing aircraft, does not involve the placement of excessive weight on the pilot's helmet and does not interfere with the ejection envelope of the aircraft. At the same time the invention is relatively inexpensive to manufacture and requires no costly alignment procedure. More importantly, the system provides for continued display of computed weapon impact points as well as a sight line for the pilot with automatic angular pickoffs to continually update the computed impact points.

The above advantages are achieved by generating a video analog of the information which one wishes to provide to the head-up display in a non-critical portion of the aircraft and optically air-coupling this information to the eye of the pilot. At the same time, a slaving mechanism may be controlled and the pilot's line-of-sight read by generating a reference signal, which carries the pilot's line-of-sight, and optically coupling that signal to a detector which provides that information to the video analog generating system and an on-board computer which controls various systems on the aircraft.

BRIEF DESCRIPTION OF THE DRAWINGS

Several ways of carrying out the invention are described in detail below with reference to drawings which illustrate only several specific embodiments, in which.

BEST MODE FOR CARRYING OUT THE INVENTION

Figure 1:
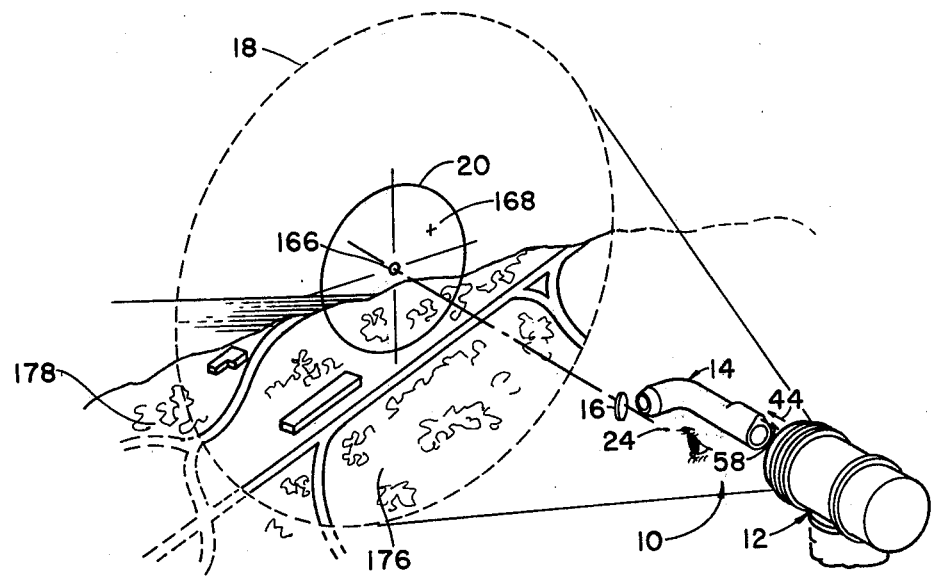
FIG. 1 is a schematic illustration of one head-up display system constructed in accordance with the present invention showing the operation of the system.

Referring to FIG. 1, a head-up display system 10 contructed in accordance with the present invention is illustrated. Generally, the system 10 comprises a video information unit 12, an optical path coupler 14 and a beamsplitter 16.

As will be described in greater detail below, the video information unit 12 generates video information (which would not otherwise be visible to the pilot when he is looking out the windscreen, such as flight data or terrain during darkness hours) corresponding to points within the unit's overall field-of-view 18. Optical path coupler 14 receives the video information generated by unit 12 and produces at its output a portion of that information corresponding to those points within the coupler's instantaneous field of view 20. While, in FIG. 1, the instantaneous field of view 20 is shown as being in the center of the overall field of view 18, during use of the inventive system the position of the instantaneous field of view will be a function of the orientation of optical coupler 14 with respect to video information unit 12.

Figure 2:
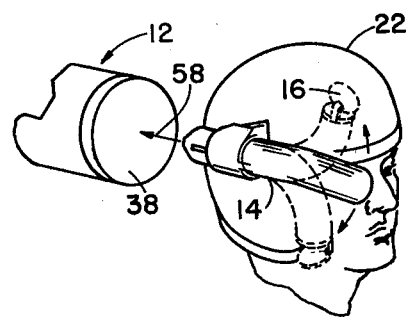
FIG. 2 illustrates the mounting of an optical coupler constructed in accordance with the present invention on the helmet of a pilot.

As shown in FIG. 2, the optical coupler 14 is secured to the helmet 22 of the pilot. The angular orientation of optical coupler 14 is thus a function of the head movement of the pilot. The movement of the pilot's head, its orientation and rate of movement is of additional value as it may be desired to tie the operation of the aircraft or its components (e.g. guns, bomb-bays, etc.) to the line-of-sight of the pilot.

Thus, beamsplitter 16 presents to the eye 24 of the pilot a picture corresponding to an instantaneous field of view 20 which is a function of the angular orientation of the pilot's head and, accordingly, his line-of-sight. The term "line-of-sight", as used herein, means a line extending from the optical center of the lens of the pilot's eye along the optical axis of the eye's lens when the pilot is looking straight ahead. Video information unit 12 is fixedly mounted in the cockpit of the aircraft behind the pilot's head. Thus, as the pilot moves his head, beamsplitter 16 presents him with video information corresponding to the instantaneous field of view 20 associated with the orientation of the optical coupler 14, which, as noted above, is rigidly secured with the respect to his head by being fixedly mounted on his helmet 22. As will be described below, the angular orientation of optical coupler 14 causes it to transmit that portion of the video information generated by the unit 12 which corresponds to the instantaneous field of view associated with the particular angular orientation at which it is disposed.

Figure 3:
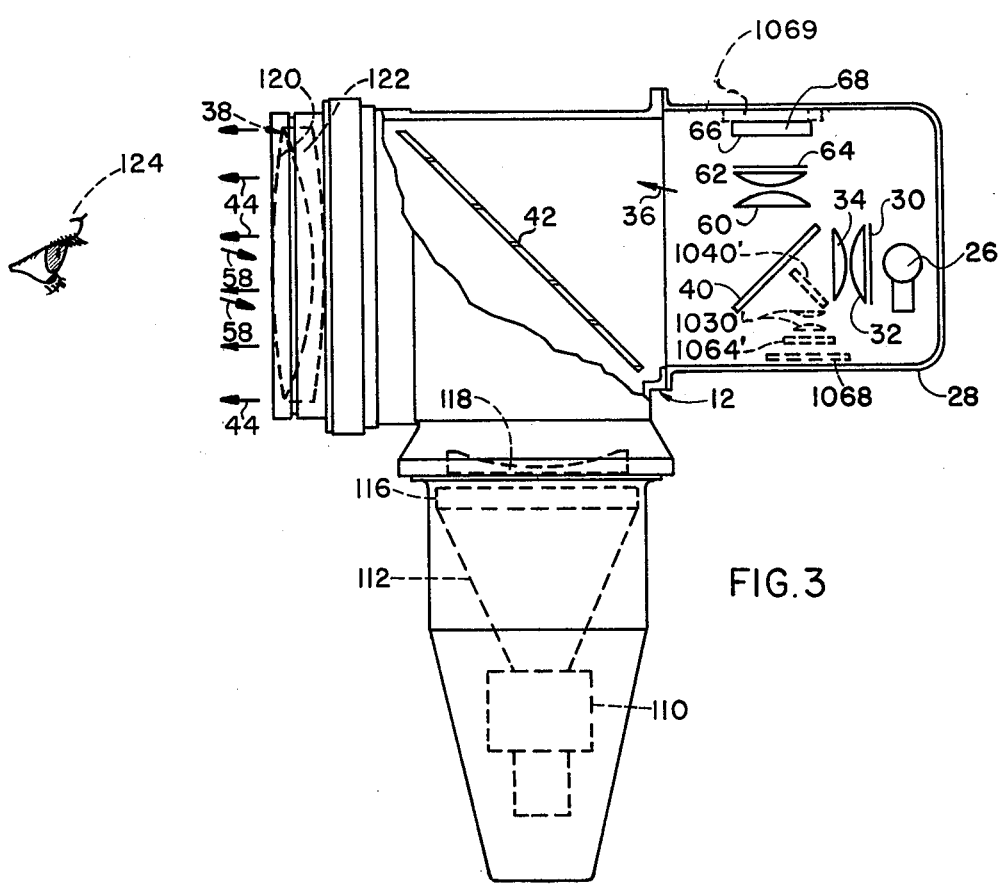
FIG. 3 is a diagrammatic illustration of a video information unit which generates a video analog of the information to be displayed by the inventive head-up system, as well as the helmet angle tracking unit.

As shown in FIG. 3, a light source 26 is fixedly mounted within the housing 28 of video information unit 12. A red filter 30 allows only red light to pass from source 26 to a pair of condensing lenses 32 and 34. Lenses 32 and 34 cause the rays 36 of red light passing through lenses 32 and 34 to converge to a point and then diverge at angles corresponding to a point source positioned at the focal point of the output lens 38 of the video information unit 12. Because of the optical properties of red beamsplitter 40 and dichroic beamsplitter 42, these red rays 36 pass through beamsplitters 40 and 42 to output lens 38 substantially unattenuated by beamsplitter 42. Output lens 38 focuses these red rays into a single bundle of parallel rays of red light 44 which are passed from the output of the video information unit 12. See also FIG. 1.

Figure 4:
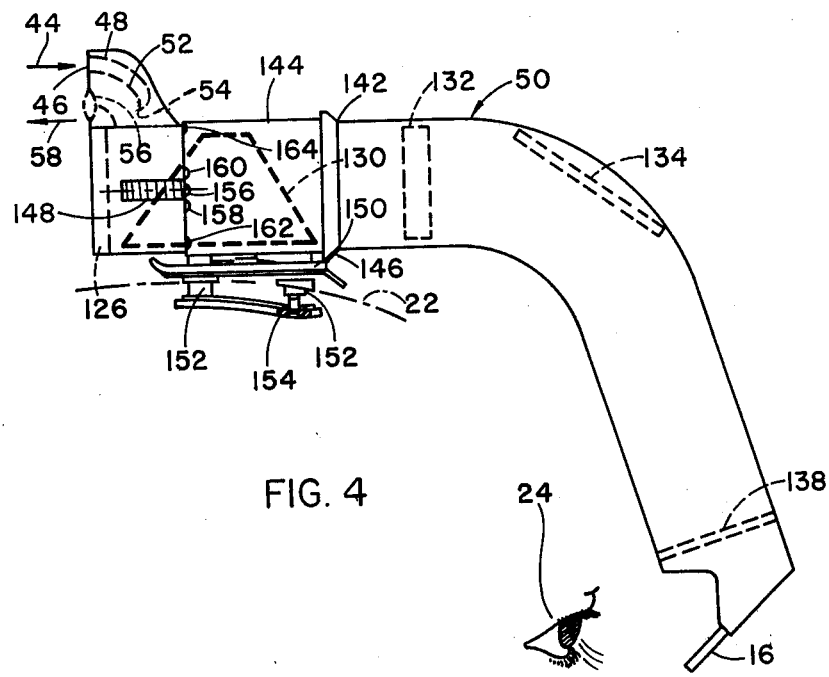
FIG. 4 is a detailed schematic view of the optical path coupler of the present invention.

As shown in FIG. 4, during operation of the inventive system parallel red light rays 44 travel toward the back of the pilot's helmet and pass through aperture 46, which is defined by a portion 48 of the housing 50 of optical coupler 14. Optically coupled to aperture 46 is the input of a tapered or unifying fiber-optic bundle 52. Fiber optic bundle 52 is tapered in such a manner that its input end, upon which light rays 44 fall, is relatively large in diameter and its output end 54 is relatively small in diameter. Thus, the output 54 of fiber optic bundle 52 acts substantially as a point source. A lens 56 is mounted within an aperture in housing portion 48 with its optical focus coincident with the output 54 of fiber optic bundle 52. The focal plane of lens 56 is selected to be of a value which results in the coincidence of the focal point of lens 46 with the output 54 of fiber optic bundle 52. Thus, the rays of red light 44 collected by the input end of bundle 52 are converted into a point source which exits from output end 54 of bundle 52. These rays, in turn, pass through lens 56 which focuses them into a parallel beam of red rays 58. The direction of parallel beam 58 is fixed with respect to the housing 50 of optical coupler 14. Thus, the direction of output rays 58 is at an angle related to the orientation of the optical path member, and, accordingly, the line-of-sight of the pilot, with respect to which the optical coupler is stationary.

As shown in FIGS. 1 and 2, parallel rays of light 58 are thus directed against lens 38 at an angle corresponding to the orientation of the pilot's line-of-sight. As shown in FIG. 3, rays of light 58 enter housing 28, pass through dichroic beamsplitter 42, which is transparent to red, to beamsplitter 40 which reflects rays 58 through a pair of imaging lenses 60 and 62 and a red filter 64. Red filter 64 filters out most of the light that enters lens 56 which does not originate from source 54. The focal point of lenses 60 and 62 are selected with values which will result in the focusing of an image from an object at infinity onto the face 66 of a dual axis photodetector 68. In the case of the red point source at output 54, this image is a spot. Because the rays of light 58 are always parallel but at a variable angle they will be brought to a focus at a position on face 66 which will vary in accordance with the angle at which rays 58 strike the surface of lens 38.

Figure 5:
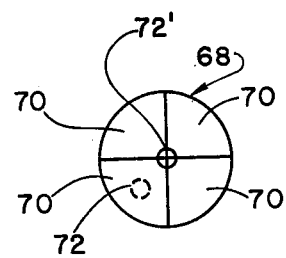
FIG. 5 is a schematic illustration of a detector which senses the pilot's line-of-sight.

As shown in FIG. 5, detector 68 is a four-quadrant device having four photo-detecting surfaces 70. The detecting circuit, within which detector 68 operates, has four output voltages which, because of the characteristics of the device, may be used to determine the position of the image of a spot 72 on face 66 with relatively good accuracy, and the detection of a spot 72' at the very center of the device with extremely high accuracy.

Figure 6:
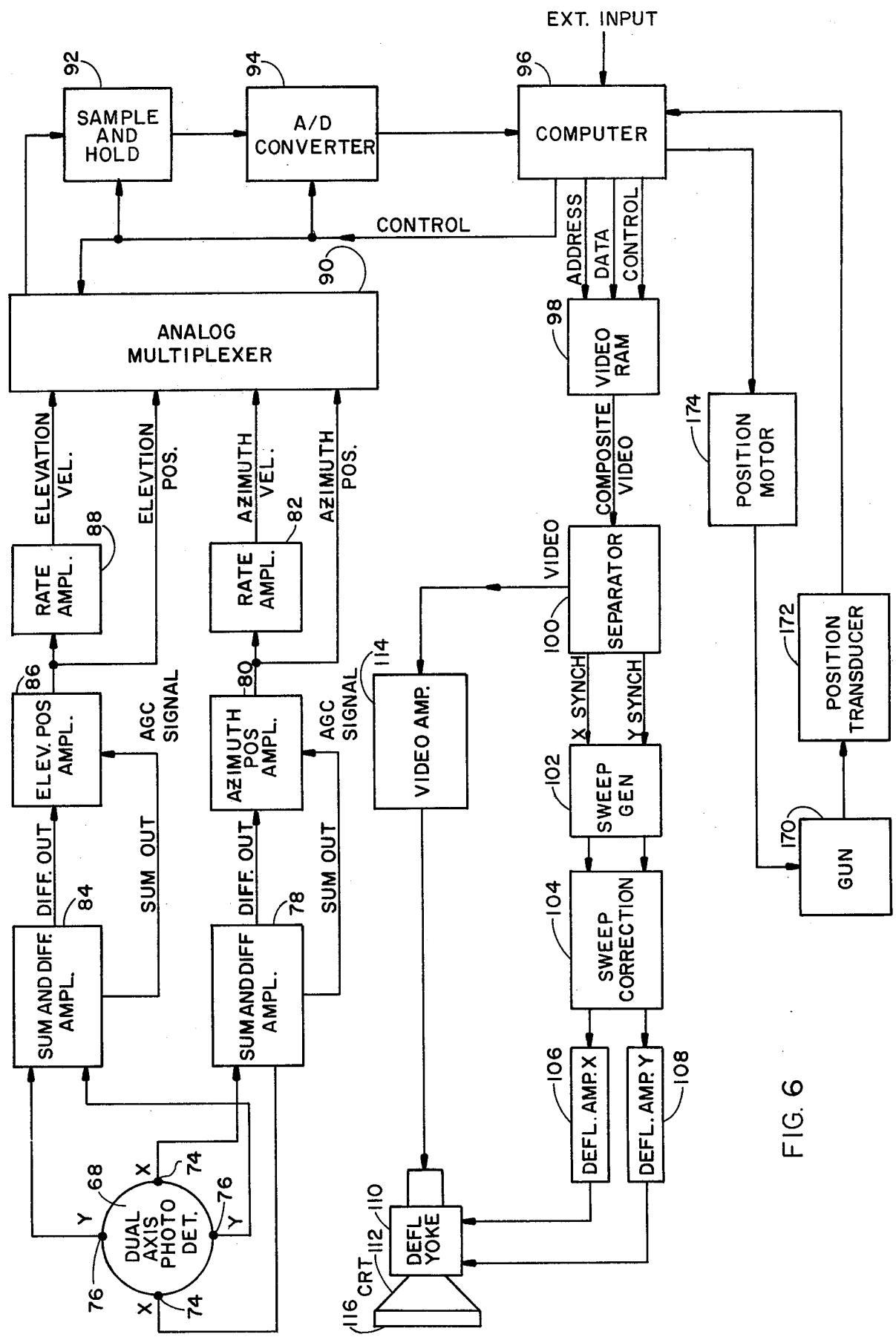
FIG. 6 is a schematic block diagram of a detector and control system for determining the pilot's line-of-sight, receiving instrumentation and other data, and providing the same to the video information unit.

As shown most clearly in FIG. 6, detector 68 has four outputs, namely, two "X" outputs 74 which develop azimuth information and two "Y" outputs 76 which develop elevation information of the pilot's line-of-sight with respect to the aircraft's axis. The "X" outputs 74 of detector 68 are sent to a sum and difference amplifier 78 which provides a difference output signal to an azimuth position amplifier 80. Inasmuch as the signals provided by the "X" output 74 are large when spot 72 is removed from the center of detector 68, sum and difference amplifier 78 generates a sum signal at its sum output which is used as an automatic gain control signal to reduce the sensitivity of amplifier 80 under those conditions. This permits the use of a relatively high gain amplifier 80 to detect relatively small variations during nearly null conditions close to that of spot positions such as that of spot 72'. The output of position amplifier 80 thus produces a signal proportional to the azimuth position of the pilot's line-of-sight with respect to the aircraft's axis. The output signal of amplifier 80 is also coupled to a rate amplifier 82 which differentiates the azimuth position signal thus providing an azimuth velocity signal. This azimuth velocity signal is proportional to the rate at which the azimuth of the pilot's line-of-sight is changing with respect to the aircraft. In a manner similar to the operation of amplifier 78, the "Y" outputs 76 of detector 68 are sent to a difference amplifier 84 whose difference output is sent to an elevation position amplifier 86 whose gain is controlled by the sum output of amplifier 84. The output of amplifier 86 is thus a function of the elevation position of the pilot's line-of-sight with respect to the aircraft's axis. This elevation position output signal is sent to a rate amplifier 88 which differentiates the elevation position signal and provides at its output an elevation velocity signal, which is a signal proportional to the rate at which the elevation position of the pilot's line-of-sight is changing with respect to the aircraft's axis.

The azimuth position and velocity signals together with the elevation position and velocity signals are sent to an analog multiplexer 90 which sequentially produces the elevation velocity signal, the elevation position signal, the azimuth velocity signal and the azimuth position signal at its output. These signals are thus sequentially coupled to a sample and hold circuit 92 whose output is sent to an analog to digital converter 94 which, in turn, provides that information in digital form to a data processor such as computer 96. In accordance with the present invention, it is contemplated that computer 96 will take the form of a microprocessor, although any other suitably programmed hardware could perform the same function.

The function of the computer is to receive the information concerning the orientation and movement of the pilot's line-of-sight with the respect to the aircraft's axis provided by analog to digital converter 94, process that information into video data and send that data, together with the address information associated with that data, to a video random access memory 98. Computer 96 also provides control signals to the analog multiplexer 90, sample and hold circuit 92 and analog to digital converter 94. Likewise, computer 96 provides control signals to video random access memory 98. Computer 96 also receives external information, such as the heading of the aircraft, the position in which guns are aimed, instrumentation readings or enhanced visual data concerning the airspace surrounding the aircraft or the land over which it is flying, and processes it for display by the video information unit 12. Such enhanced visual data can be generated artificially from known geographic data and aircraft position and velocity information or may be generated in the aircraft by the use of infrared sensitive television cameras or cameras provided with optical/electronic image enhancers.

Random access memory 98 may thus be provided with a wide variety of video information together with address and control information by computer 96. Memory 98 may also be provided with alpha-numeric information for displaying the output from various aircraft instruments. This data would also be provided to memory 98 through computer 96. In response to the information, control and address signals generated by computer 96, memory 98 produces a composite video signal at its output. This composite signal is sent to a separator circuit 100 which produces a video or intensity signal at one of its outputs, an "X" synch signal at a second output and a "Y" synch signal at a third output. The "X" and "Y" synch signals are sent to a sweep generator 102 which generates a pair of sweep signals synchronized with the video signal produced by separator 100. These sweep signals are then sent to a sweep correction circuit 104 which performs the function of correcting the sweep to provide the proper mapping of the video display for optical projection to any degree that may be required by the optical projection system characteristics. The corrected sweep signals are then sent to "X" and "Y" deflection amplifiers 106 and 108, respectively. Deflection amplifiers 106 and 108, in turn, have their outputs connected to a deflection yoke 110 which surrounds the neck of a cathode ray tube 112. The video signal produced by separator 100 is coupled to a video amplifier 114 which in turn drives cathode ray tube 112 modulating the intensity of the electron beam deflected by the "X" and "Y" deflection amplifier output signals.

Cathode ray tube 112 may thus be caused to display on its screen such items as enhanced views of the image seen by the pilot through the windscreen, a reticle (or "bull's eye") indicative of the pilot's line-of-sight with respect to that enhanced view, a second reticle indicative of the point at which the guns on the aircraft are aimed with respect to that view, a selection of instrument readings, or combinations of some or all of these or similar items of information.

As shown most clearly in FIG. 3, cathode ray tube 112 is housed within housing 28 of the video information unit 12. The images produced on the screen 116 of cathode ray tube 112 are green in color and are thus reflected by a dichroic beamsplitter 42. The image screen 116 is collimated by lenses 38 and 118. As discussed above, beamsplitter 42 is of the dichroic variety, and, accordingly, reflects green light and transmits red light, thus functioning to pass the red light from source 26 while acting as a mirror with respect to the image produced on the screen 116 of cathode ray tube 112. The image produced on screen 116 is thus reflected through lens 38. It is noted that lens 38 is a compound lens comprising convex member 120 and a concave member 122. The focal length of the objective lens 38 is such that the image on screen 116 appears to emanate from a plane positioned from lens 38 at a distance equal to the focal length of lens 38. Thus, if one were to position an imaginary observer 124 in front of lens 38, he would view the image presented on screen 116 as an image which would appear to emanate from infinity. Part of that image, if the observer could see the near infra-red, would be an image of source 26 which would indicate the longtitudinal axis of the aircraft.

Figure 7:
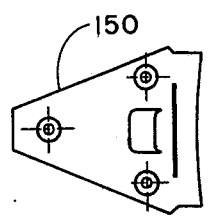
FIG. 7 is a detail of the mounting plate used to secure the optical path coupler to the pilot's helmet.

As illustrated in FIG. 1, the pilot eye's 24 is oriented opposite the direction of the imaginary observer 124. Accordingly, optical coupler 14 is required in order to bring the image on screen 116 to the pilot's eye. As shown in FIG. 4, this is done through a series of optical members in coupler 14 including a lens 126, a prism 130, a lens 132, a mirror 134, a lens 138, and a beamsplitter 16. The effect of optical elements 126 through 138 is to deflect a bundle of substantially parallel rays impinging upon lens 126 at different angles and direct them through the housing 142 of optical coupler 14 to exit through lens 138 at substantially the same angle at which they entered lens 126. These rays of light forming the image on screen 116 are then reflected by beamsplitter 16 to the pilot's eye, thus allowing the pilot to view the image. Moreover, the beamsplitter 16 allows the pilot to see through the beamsplitter, thus preserving his direct visual contact with the scene outside the windscreen of the aircraft. Coupler 14 is retained in position by annular ridge 146 and a spring loaded stud in a cartidge 148. Annular support 144 engages a mounting plate 150 (FIG. 7) which is secured to helmet 22 by three bolts 152 which, in turn, are secured to a backing plate 154.

Figure 8:
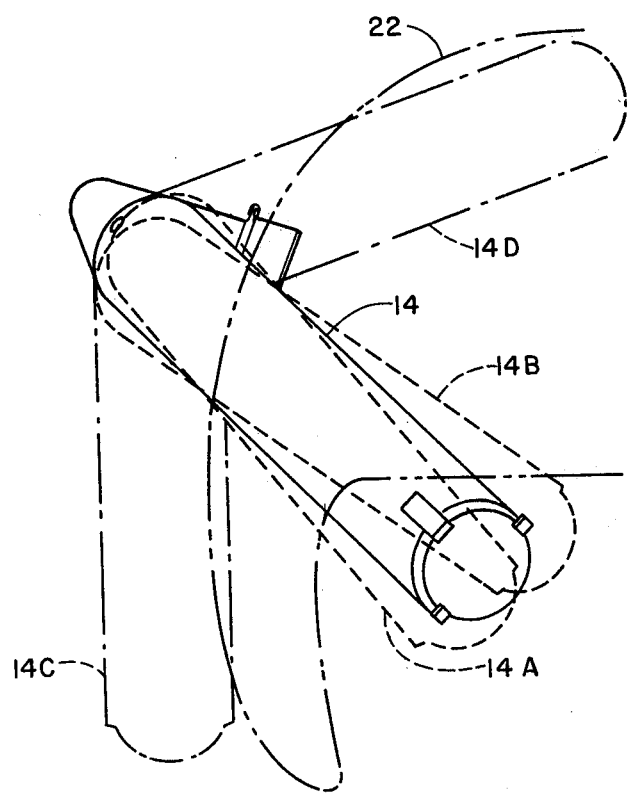
FIG. 8 illustrates multiple postioning of the optical path coupler with respect to the pilot's helmet, whereby he may put it in a stow position.

The angular position of optical coupler 14 may be varied with respect to helmet 22 as illustrated in FIG. 8. It is contemplated that coupler 14 will assume one of the five positions illustrated in either solid or broken lines in FIG. 8. Coupler 14 is retained in one of the five preset angular positions indicated in FIG. 8 by the engagement of a spring loaded stud contained within cartridge 148 with annular support 144. Thus, engagement of the stud with detents 156, 158, 160, 162, and 164 will result in positioning the optical coupler in the position of couplers 14, 14a, 14b, 14c, or 14d, respectively. It is contemplated that the position indicated by coupler 14 will be the position of normal use of the device, although pilot preference may result in positioning the coupler in either the position of coupler 14a or 14b during use. Coupler 14c and 14d are positioned in stow positions, either one of which may be selected by the pilot in accordance with his preference.

Thus, as illustrated in FIG. 3, a source 26 generates red light which is sent through lens 38 to a tapered fiber optic bundle 52 which converts it to a point source which is focused by lens 56 into parallel light rays whose angle of orientation corresponds to the angle of orientation of the line-of-sight of the pilot with respect to the aircraft's axis. These rays are passed through lens 38 and beamsplitter 42 and reflected by beamsplitter 40 onto a detector 68. This detector drives the sum and difference amplifiers and rate amplifiers, thus generating position and velocity signals with respect to both elevation and azimuth. This information is sent to a computer 96 which receives a number of other informational inputs and sends them to a video random access memory 98 which converts them to a video signal which is displayed on a screen 116. Included among the items of information displayed on screen 116 is reticle 166 indicating the pilot's line-of-sight. This last reticle is generated in response to the elevation position, and azimuth position signals sent to analog multiplexer 90. Likewise a reticle 168 indicating the computed inpact point of a gun could also be electronically displayed.

In use, the pilot will position the reticle indicating his line-of-sight on a desired object. He could then instruct the computer to, for example, aim one of the aircraft's guns 170 coincident with his line-of-sight (which when maintained on the target, develops all of the angular position and velocity information required by the computer to adjust lead angles with respect to all three axis for any type of weapon delivery) and, thus, at that object. A transducer 172 at the gun 170 provides the computer 96 with the feedback position information indicating the point at which the gun is aimed. The computer then compares this feedback information with the information indicating the pilot's line-of-sight and adjusts the orientation of the guns using an appropriate motor 174. When reticles 166 and 168 coincide, the pilot could fire the gun at the target.

Likewise, during use, in addition to seeing a reticle 166 indicating his line-of-sight and another reticle 168 indicating the point at which the weapons will impact, the pilot could be provided with an enhanced or an artificial visual image 176 which would be easier to see than the normal image 178 which would be visible outside his windscreen without the inventive head up display system.

Figure 9:
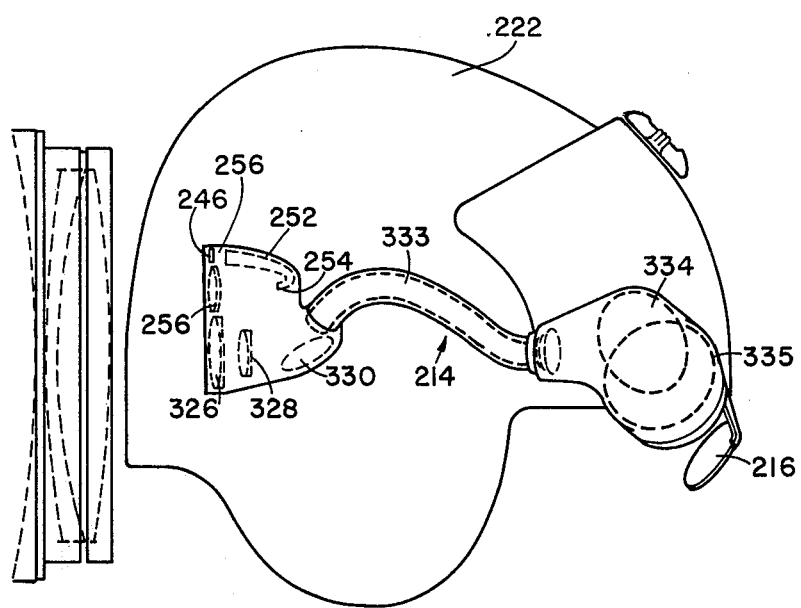
FIG. 9 is a plan view of a particularly advantageous embodiment of the present invention.

Referring to FIG. 9, where corresponding parts, or parts performing corresponding functions, have been given numeric designations two-hundred higher than the designation of corresponding parts of the embodiment illustrated in FIG. 4, an alternative embodiment of the invention includes the use of an optical coupler 214 as illustrated in FIG. 9. The primary difference in this embodiment is the replacement of the conventional refractive optics (elements 126 through 138) of FIG. 4 with a mirror 330, a fiber optic bundle 333, and mirror 334. Parallel light beams incident on lens 326 at various angles are directed to compound lens 328, which transmits the beams to mirror 330. Mirror 330 reflects the beams and focuses the image onto fiber optic bundle 333 which carries the light rays to the front of helmet 222 and causes the light rays to be incident upon mirror 334. Mirror 334 reflects the light rays into collimating lens 335 and thence to beamsplitter 216, allowing the pilot to view the image at infinity and against the outside world. As in the previous embodiment beamsplitter 216 allows the pilot simultaneously to view the scene outside the windscreen through the beamsplitter.

The on-helmet portion of the line-of-sight pickoff system, consisting of input aperture 246, tapered fiber optic bundle 252, output end 254 and lens 256, operates in the same manner as does the corresponding pickoff system described above and illustrated in FIG. 4.

One important advantage of this embodiment is that the optical distance traveled by the image is reduced by the use of the fiber optic bundle, which, effectively, has an optical length equal to zero. This alternative embodiment also offers the practical considerations of lighter weight and fewer elements. The latter of these two advantages makes assembly simpler and operation more reliable.

Figure 10:
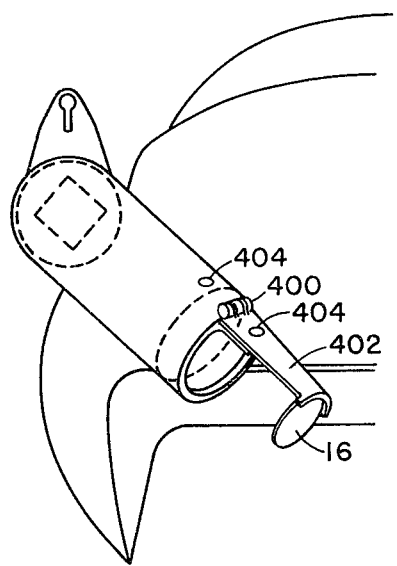
FIG. 10 illustrates an alternative embodiment for retracting the device to a stow position out of the pilot's line-of-sight.

Another alternative embodiment involving an alternative means for removing the beamsplitter 16 from the pilot's line-of-sight is shown in FIG. 10. Hinge 400 allows the pilot to push arm 402, which holds beamsplitter 16, up and thus out of his line-of-sight. It may be secured in this position by mating snaps 404. This embodiment eliminates the movement required to store the device while out of use as illustrated in FIG. 8.

Figure 11A:
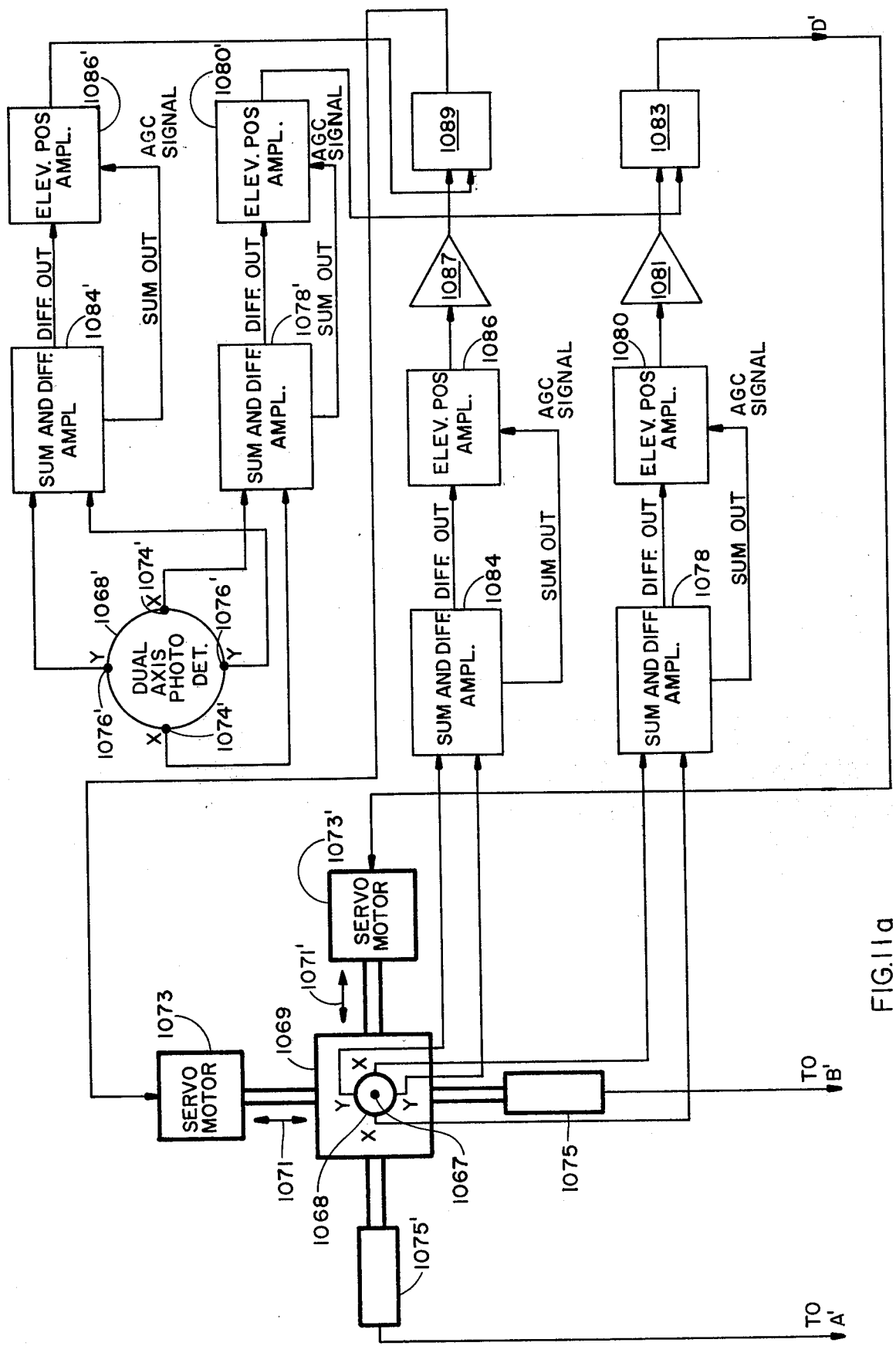
FIGS. 11a and 11b together, with wires bearing arrows A' connected to each other and wires bearing arrows B' connected to each other, comprise a diagram illustrating an alternative detector and control system.
Figure 11B:
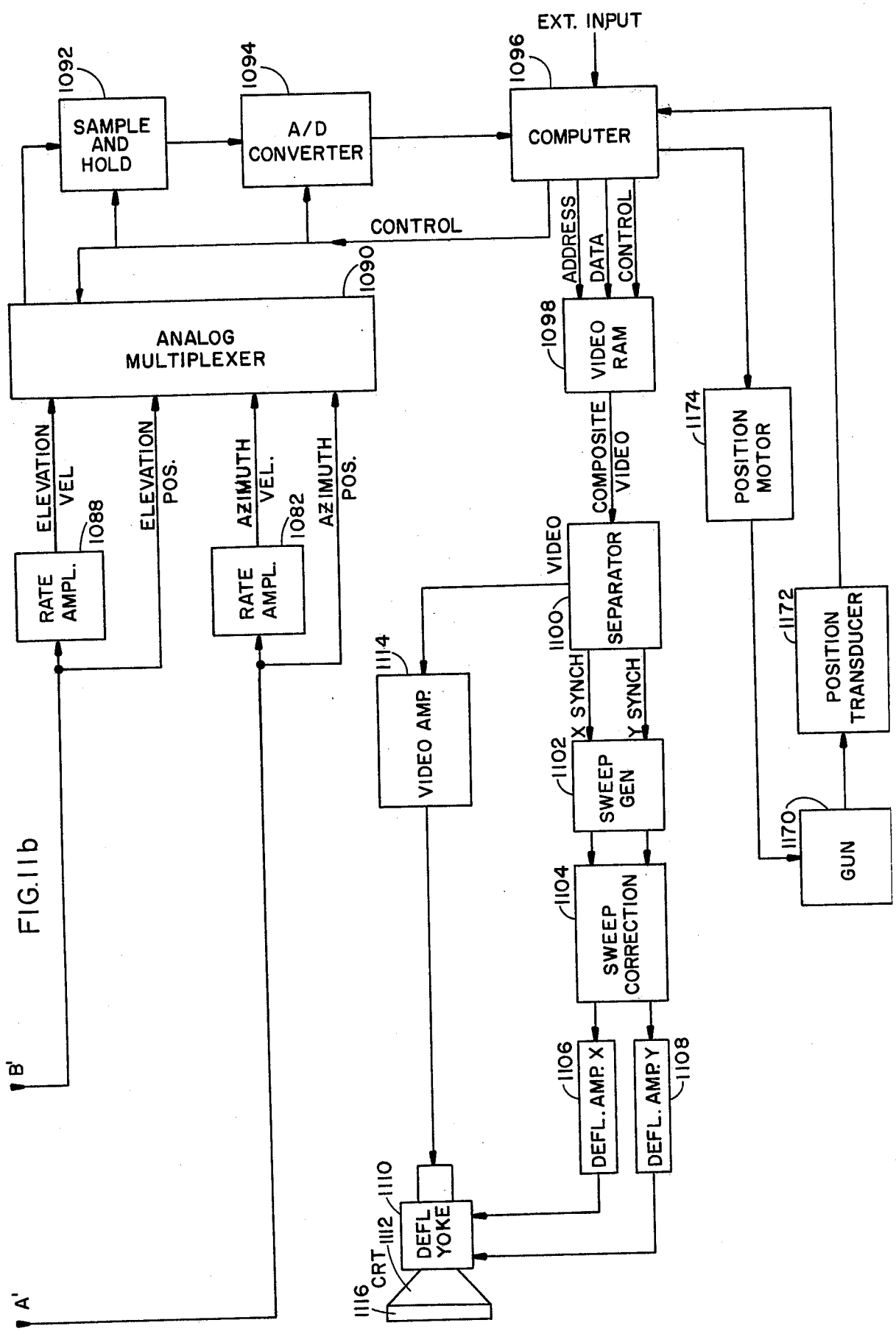

An alternative electronic system for receiving, detecting and utilizing the line-of-sight information provided by the optical apparatus of the invention illustrated in FIGS. 1–10, is illustrated in FIG. 11. Generally, the operation of the circuit illustrated in FIG. 11 is analagous to the operation of FIG. 6. Accordingly, elements of the system performing substantially similar functions have been given reference numerals one thousand higher than the corresponding elements of FIG. 6. The system of FIG. 11 differs from that of FIG. 6 inasmuch as the dual axis photodetector is mounted on a mechanical assembly which is moved to a position where spot 72, which is the image of the light source at the output of lens 56, coincides with the center 1067 of four quadrant detector 1068. Detector 1068 is mounted on a movable platform 1069 which is mounted for linear movement along the orthogonal directions indicated by arrows 1071 and 1071'. Table 1069 is moved in the "Y" direction by servo motor 1073 and in the "X" direction by servo motor 1073'. The displacement of the table in the "Y" direction is detected by potentiometer 1075, while its displacement in the "X" direction is detected by potentiometer 1075'. The operation of this system illustrated in FIG. 11 is particularly advantageous inasmuch as the servo motors keep the spot in the center of the detector (where the detector is most accurate as a position sensing device) with the position of the table being read to detect the actual position of the spot and, thus, the line-of-sight of the pilot. The added accuracy is achieved because of the fact that the potentiometers 1075 and 1075' are more accurate in their operation than detector 1068 when detector 1068 is used to read the position of a focused image displaced a substantial distance from the center of its quiescent position.

During operation of the system illustrated in FIG. 11, the position of the focused spot is detected by detector 1068 which sends its outputs to sum and difference amplifiers 1078 and 1084, which derive the azimuth and elevation information position, respectively. This information, in turn, is sent to a pair of automatic gain controlled amplifiers 1080 and 1086. The output of amplifiers 1080 and 1086 are, in turn, amplified by a pair of amplifiers 1081 and 1087. The outputs of amplifiers 1081 and 1087 are, under normal operating conditions, passed by decision circuits 1083 and 1089, respectively, to servo motors 1073' and 1073, respectively. If the spot is not at the center of detector 1068, the outputs of decision circuits 1083 and 1089 will, thus, be greater than zero. This will activate servo motors 1073 and 1073' to move table 1069 until a null condition is achieved where the spot coincides with the center 1067 of detector 1068. During the null condition, the signal produced by potentiometers 1075 and 1075' will contain accurate elevation and azimuth information, respectively. This information is sent to rate amplifiers 1088 and 1082 and analog multiplexer 1090 together with the output of the rate amplifiers.

As a result of a sudden and relatively large movement of the pilot's head, and a correspondingly large and sudden change in his line-of-sight, it is possible that the spot of light focused on the center 1067 of detector 1068 would become displaced to a point off the detecting face of detector 1068. Accordingly, a wide field detector 1068' would generate centering information when the spot is focused on a point which is off detector 1068. Detector 1068' is also a four quadrant device. Thus, detector 1068 would produce centering information under most normal operating conditions and, in the event that the spot of light is focused on a point off detector 1068, it would still fall on detector 1068', which is provided with optics for a wider field of view as will be described below. The added elements of the two-detector structure are illustrated in phantom lines in FIG. 3. Detector 1068' could be a simple four-quadrant device, positioned, as illustrated in phantom lines in FIG. 3, and provided with a signal by beamplitter 1040', image focusing lenses 1030' and red filter 1064'.

Referring back to FIG. 11, the output of detector 1068' is fed to a pair of sum and difference amplifiers 1078' and 1084' which, in turn, drive the azimuth and elevation position amplifiers 1080' and 1086', respectively, with a difference signal and an automatic gain control signal, which control signal is the sum output of amplifiers 1078' and 1084'. This signal is then furnished to decision circuits 1083 and 1089 which, in the event of a position signal output from amplifiers 1080' or 1086', will block the passage of the output signal provided by amplifiers 1081 and 1087 and, instead, pass the outputs of amplifiers 1080' and 1086' to servo motors 1073' and 1073. However, even under these circumstances, the response of the servo motors to the centering information provided by detector 1068' is sufficiently quick that it is only necessary to read the output of potentiometers 1075 and 1075' to obtain a continuous picture of the pilot's line-of-sight with only minimal delays. Thus, analog multiplexer 1090 is continuously provided with line-of-sight information and corresponding velocity information.

In much the same manner as analog multiplexer 90, analog multiplexer 1090 sequentially produces the elevation velocity signal, the elevation position signal, the azimuth velocity signal and the azimuth position signal at its output. These signals are thus sequentially coupled to a sample and hold circuit 1092 whose output is sent to an analog-to-digital converter 1094 which, in turn, provides that information to a data processor such as computer 1096. In accordance with the present invention, it is contemplated that computer 1096 will take the form of a microprocessor, although any other suitably programmed hardware could perform the same function.

The function of the computer is to receive the information, concerning the orientation and movement of the pilot's line-of-sight with respect to the aircraft's axis, provided by analog to digital converter 1094, process that information into video data and send that data, together with the address information associated with that data, to a video random access memory 1098. Computer 1096 also provides control signals to the analog multiplexer 1090, sample and hold circuit 1092 and analog to digital converter 1094. Likewise, computer 1096 provides control signals to video random access memory 1098. Computer 1096 also receives external information, such as the heading of the aircraft, the position in which guns are aimed, instrumentation readings or enhanced visual data concerning the airspace surrounding the aircraft of the land over which it is flying, and processes it for display by the video information unit 12. Such enhanced visual data can be generated artificially from known geographic data and aircraft position and velocity information or may be generated in the aircraft by the use of infrared sensitive television cameras or cameras provided with optical/electronic image enhancers.

Random access memory 1098 may thus be provided by computer 1096 with a wide variety of video information together with address and control information. Memory 1098 may also be provided with alpha-numeric information for displaying the output from various aircraft instruments. This data would also be provided to memory 1098 through computer 1096. In response to the information, control and address signals generated by computer 1096, memory 1098 produces a composite video signal at its output. This composite signal is sent to a separator circuit 1100 which produces a video or intensity signal at one of its outputs, an "X" synch signal at a second output and a "Y" synch signal at a third output. The "X" and "Y" synch signals are sent to a sweep generator 1102 which generates a pair of sweep signals synchronized with the video signal produced by separator 1100. These sweep signals are then sent to a sweep correction circuit 1104. The corrected sweep signals are then sent to "Y" and "Y" deflection amplifiers 1106 and 1108, respectively. Deflection amplifiers 1106 and 1108, in turn, have their outputs connected to a deflection yoke 1110 which surrounds the neck of a cathode ray tube 1112. The video signal produced by separator 1100 is coupled to a video amplifier 1114 which in turn drives cathode ray tube 1112 modulating the intensity of the electron beam deflected by the "X" and "Y" deflection amplifier output signals.

Cathode ray tube 1112 may thus be caused to display on its screen such items as enhanced views of the image seen by the pilot through the windscreen, a reticle (or "bull's eye") indicative of the pilot's line of sight with respect to that enhanced view, a second reticle indicative of the point at which the guns on the aircraft will impact with respect to that view, a selection of instrument readings, or combinations of some or all of these or similar items of information.

While several illustrative embodiments of the invention have been described, it is, of course, understood that modifications of the disclosed structure will be obvious to those of ordinary skill in the art. Such modifications are within the spirit and scope of the invention which is limited and defined only by the following claims.

I claim:

1. A system for presenting a head-up display to the pilot of an aircraft, comprising, data means for generating data, data processing means responsive to said data means for producing a video signal carrying an image of said generated data, video display means for displaying a video image of said data, a light transmitting waveguide having an optical length very much smaller than its physical length, secured, positioned, configured and dimensioned to receive at least a portion of the light rays of said video image and direct said light rays along its length to output means for reflection toward the eye of the pilot, and beamsplitter means positioned over the field-of-view of the pilot and positioned with respect to the output of said waveguide for reflecting the light rays leaving the output of said waveguide toward the pilot's eye and transmitting light from objects surrounding the pilot to the pilot's eye, light generating means for generating an optical signal indicating a line-of-sight of the pilot, detector means optically coupled to said light generating means for receiving said optical signal and detecting the line-of-sight of the pilot and producing signals carrying line-of-sight information, data processing means responsive to said detector means for generating a video signal carrying an image of the line-of-sight of the pilot, said video signal being coupled to said video display means to cause said video image to include an indication of the line-of-sight of the pilot, said optical signal being of a color different from said video image and wherein said detector means is housed within said video display means and said video display means comprises a dichroic beamsplitter which reflects said video image toward said waveguide and transmits said optical signal to said detector means, said detector means being moved by motor means to position the image of said light generating means at the center of said detector means, whereby the position of said detector means indicates the line-of-sight of the pilot.

2. A system as in claim 1, wherein said optical length is substantially zero.

3. A system as in claim 1, wherein said waveguide is a fiber optic bundle.

4. A system as in claim 3, wherein said beamsplitter means and said fiber optic bundle are secured to a headgear worn by the pilot.

5. A system as in claim 1, wherein said waveguide is associated with said headgear and said beamsplitter means is secured to the waveguide for movement with respect to said waveguide out of the sight of the pilot.

6. A system as in claim 1, further comprising instrumentation means for generating additional information-bearing data signals, said instrumentation means being coupled to said data processing means, and said data processing means being responsive to said additional data signals to include an additional image of the information carried by said additional data signals in said video signal whereby said video display means produces an image of the information carried by said data and said additional data signals.

7. A system as in claim 1 wherein said light generating means generates a bundle of parallel light rays whose orientation is fixed with respect to the headgear worn by the pilot.

8. A system as in claim 1 wherein said coupler means together with said reflecting member may be displaced to a stow postion out of the field-of-view of the pilot's eye.

9. A system as in claim 1 wherein said image is produced behind the pilot.

10. A system as in claim 1 wherein said image is optically air-coupled to said coupler means and said coupler means is mechanically independent of said video display means.

11. A system as in claim 1 wherein said optical signal is of a color different from said video image and wherein said detector is housed within said video display means and said video display means comprises a dichroic beamsplitter which reflects said video image toward said coupler means and transmits said said optical signal to said detector means.

12. A system as in claim 1, further comprising a light source which produces light having a color different from that of said video image and means for transmitting the output of said light source to said light generating means, said light generating means comprising means for collecting said output of said light source and directing it to return towards said detector means at an angle relative to said headgear related to the line-of-sight of the pilot.

13. A system as in claim 1 or 12, wherein said detector means comprises a four quadrant detector which is moved by a motor means, to position the image of said light generating means at the center of said detector means, whereby the position of said detector means indicates the line-of-sight of the operator and wherein said detector means and said light source are optically behind said dichroic beamsplitter.

14. A system as in claim 1 wherein said means for transmitting the output of said light source is a beamsplitter positioned, configured and dimensioned to transmit the output of said light source and reflect the light returned toward said detector means to said detector means.

15. A system as in claim 1, wherein said video display means includes a simulated or enhanced picture of the scene viewed by the operator or pilot, said scene being varied in response to said line-of-sight.

16. A system as in claim 1, wherein said detector means comprises a fine detector which is moved by a motor means, to position the image of said light generating means at the center of said fine detector, whereby the position of said fine detector indicates the line-of-sight of the pilot, said fine detector having a first field-of-view, and said detector means further comprising a coarse detector having a wider field-of-view, said coarse detector controlling said motor means to move said fine detector to receive the output of said light generating means in the event that said image is not disposed on said fine detector.

17. A system in claim 1 wherein said detector means comprises a four quadrant detector which is moved by a motor means, to position the image of said light generating means at the center of said detector means, whereby the position of said detector means indicates the line of sight of the pilot and wherein said detector means and light source are optically behind said dichroic beam splitter, said means for transmitting the output of said light source is a beamsplitter positioned, configured and dimensioned to transmit the output of said light source and refect the light returned toward said detector means, and wherein said optical path of said detector means substantially coincides with said optical path of said video display means and said coupler means.

18. A system for presenting a head-up display to a pilot wearing a headgear, comprising:
(a) light generating means for generating an optical signal indicating the line-of-sight of the pilot;
(b) detector means optically coupled to said light generating means for receiving said optical signal and detecting the line-of-sight of the pilot, and producing signals carrying line-of-sight information;
(c) data processing means responsive to said detector means for generating a video signal carrying an image of the line-of-sight of the pilot;
(d) video display means, responsive to said video signal for displaying a video image of the line-of-sight of the pilot; and
(e) coupler means, optically coupled to said video image for directing said image to an eye of the pilot, wherein said light generating means is associated with said headgear, said detector means is mechanically independent of said light generating means, said optical signal is of a color different from said video image, said detector means is housed within said video display means, and said video display means comprises a dichroic beamsplitter which reflects said video image toward said coupler means and transmits said optical signal to said detector means.

19. A system as in claim 18, wherein said detector means is a quadrant detector having four photo-sensitve quadrants.

20. A system for producing a head-up display of visual data for a pilot of a vehicle or simulated vehicle comprising:
(a) first data means for generating a first information-bearing data signal indicating the line-of-sight of the pilot, said first data means comprising light generating means for generating an optical signal, said light generating means being associated with the headgear of the pilot;
(b) second data means for generating a second information-bearing data signal indicating the orientation of an element of the aircraft;
(c) computer means responsive to said first and second data signals for generating a video signal carrying a video image of the information carried by said second data signal said optical signal being of a color different from said video image;
(d) means for displaying the line-of-sight to the pilot;
(e) video display means, positioned outside the ejection envelope of the aircraft for displaying said image of said second data signal;
(f) servo means responsive to said computer means for varying the orientation of said element of the aircraft as a function of the line-of-sight of the pilot; and
(g) optical coupler means mechanically independent of said video means and optically air coupled to said image of said second data signal for superimposing said image on the substantially unobstructed view of the pilot; and
(h) detector means mechanically independent of said light generating means for detecting the line-of-sight of the pilot, said detector means being housed within said video display means and said video display means comprising a dichroic beamsplitter which reflects one of said video image or said optical signal toward said coupler means and transmits said optical signal to said detector means.

21. A system as in claims 18 or 20 further comprising a light source which produces light having a color different from that of said video images and means for transmitting the output of said light source to said light generating means, said light generating means comprising means for collecting said output of said light source and directing it towards said detector means at an angle relative to said headgear related to the line-of-sight of the pilot.

22. A system as in claim 18 or 20, wherein the optical path of said detector means substantially coincides with the optical path of said video display means and said coupler means.

23. A system as in claim 22, wherein said light generating means generates a bundle of parallel light rays whose orientation is fixed with respect to said headgear worn by the pilot, said bundle of parallel light rays being of a color different from the color of said image generated by said video display means.

* * * * *